United States Patent
Chang et al.

(10) Patent No.: US 7,161,769 B1
(45) Date of Patent: Jan. 9, 2007

(54) DISK DRIVE HAVING AN ACTUATOR ARM ASSEMBLY THAT INCLUDES STAMPED ACTUATOR ARMS

(75) Inventors: Ken L. Chang, Saratoga, CA (US); Kamran Oveyssi, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 494 days.

(21) Appl. No.: 10/651,411

(22) Filed: Aug. 29, 2003

(51) Int. Cl.
*G11B 5/54* (2006.01)

(52) U.S. Cl. .................. 360/265.9; 360/266.1
(58) Field of Classification Search .......... 360/265.9, 360/266.1
See application file for complete search history.

(56) References Cited

U.S. PATENT DOCUMENTS

| | | | | |
|---|---|---|---|---|
| 5,291,360 A * | 3/1994 | Foote | ................ | 360/244.5 |
| 5,717,549 A * | 2/1998 | Jurgenson | ................ | 360/266.1 |
| 5,966,269 A * | 10/1999 | Marek et al. | ................ | 360/244.3 |
| 6,229,677 B1 * | 5/2001 | Hudson et al. | ................ | 360/266.1 |
| 6,477,017 B1 * | 11/2002 | Kohei et al. | ................ | 360/265.9 |
| 6,563,676 B1 * | 5/2003 | Chew et al. | ................ | 360/264.7 |
| 6,636,383 B1 * | 10/2003 | Chew | ................ | 360/245.9 |
| 6,683,756 B1 | 1/2004 | Zhao et al. | ................ | 360/265.8 |
| 6,687,094 B1 | 2/2004 | Liu et al. | ................ | 260/265.7 |
| 6,728,072 B1 | 4/2004 | Van Sloun et al. | ................ | 360/244.6 |
| 6,765,764 B1 * | 7/2004 | Misso et al. | ................ | 360/266.1 |
| 6,836,387 B1 * | 12/2004 | Ohba et al. | ................ | 360/97.01 |
| 6,982,853 B1 * | 1/2006 | Oveyssi et al. | ................ | 360/265.9 |
| 7,092,216 B1 * | 8/2006 | Chang et al. | ................ | 360/265.9 |
| 2002/0057536 A1 * | 5/2002 | Boutaghou et al. | ................ | 360/265.9 |
| 2002/0064000 A1 * | 5/2002 | Liu et al. | ................ | 360/265.9 |
| 2003/0030941 A1 * | 2/2003 | Lau et al. | ................ | 360/266 |
| 2003/0076633 A1 | 4/2003 | Macperson et al. | ................ | 360/265.7 |

* cited by examiner

*Primary Examiner*—Jefferson Evans
(74) *Attorney, Agent, or Firm*—Young Law Firm (57) ABSTRACT

A disk drive includes a disk and a head stack assembly. The head stack assembly includes an actuator arm assembly that includes first and second stamped actuator arms. The first stamped actuator arm may include a first arm portion, a first body portion and a coil-supporting portion for supporting a coil of a VCM. The first body portion defines a first contact surface. The second stamped actuator arm may include a second arm portion and a second body portion, the second body portion defining a second contact surface. According to one embodiment, the first and second stamped actuator arms may be attached to one another such that the first contact surface faces and contacts the second contact surface.

23 Claims, 8 Drawing Sheets

DISK DRIVE HAVING AN ACTUATOR ARM ASSEMBLY THAT INCLUDES STAMPED ACTUATOR ARMS

BACKGROUND OF THE INVENTION

1. Field of the Invention

The present invention relates to disk drives. More particularly, the present invention relates to actuator arm assemblies and to head stack assemblies and disk drives incorporating such actuator arm assemblies.

2. Description of the Prior Art

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a slider with at least one transducer or read/write element for reading and writing data. The HSA is controllably positioned by a servo system in order to read or write information from or to particular tracks on the disk. The typical HSA has three primary portions: (1) an actuator arm assembly that moves in response to the servo control system; (2) a head gimbal assembly ("HGA") that extends from the actuator arm assembly and biases the slider toward the disk; and (3) a flex cable assembly that provides an electrical interconnect with minimal constraint on movement.

A typical HGA includes a load beam, a gimbal attached to an end of the load beam, and a slider attached to the gimbal. The load beam has a spring function that provides a "gram load" biasing force and a hinge function that permits the slider to follow the surface contour of the spinning disk. The load beam has an actuator end that connects to the actuator arm and a gimbal end that connects to the gimbal that supports the slider and transmits the gram load biasing force to the slider to "load" the slider against the disk. A rapidly spinning disk develops a laminar airflow above its surface that lifts the slider away from the disk in opposition to the gram load biasing force. The slider is said to be "flying" over the disk when in this state.

Figure 1A:
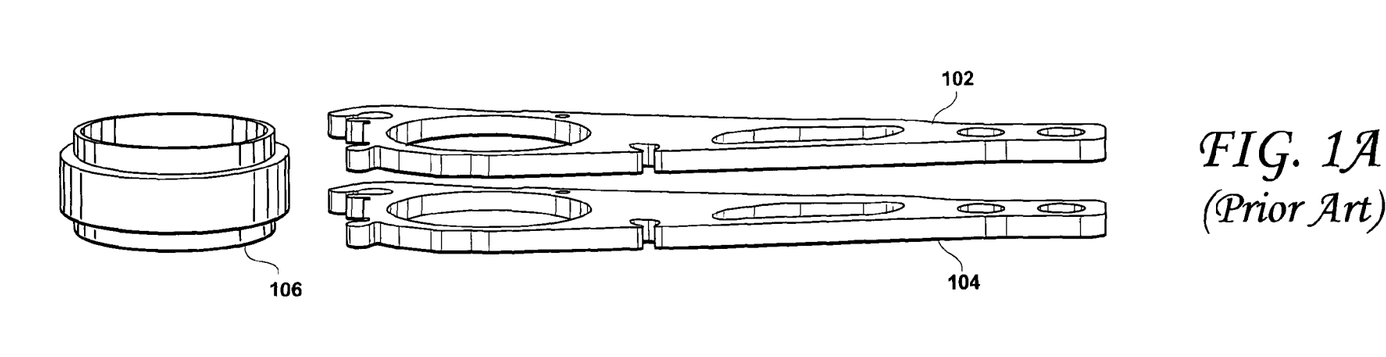
FIG. 1A shows an exploded view of portions of a conventional stamped actuator arm assembly.
Figure 1B:
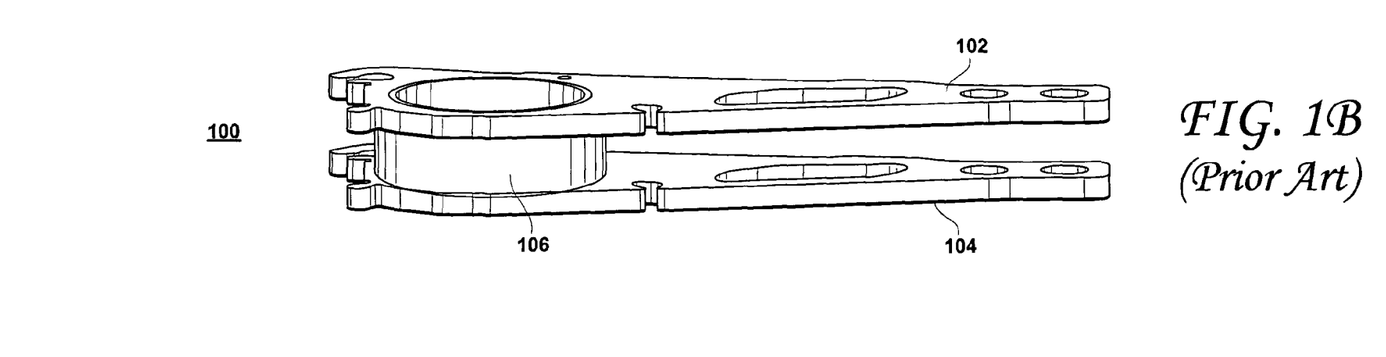
FIG. 1B shows the portions of the actuator arm assembly of FIG. 1A, with the collar fitted to the two actuator arms.

FIG. 1A shows an exploded view of portions of a conventional actuator arm assembly that includes two stamped actuator arms. FIG. 1B shows the portions of the conventional actuator arm assembly of FIG. 1A, with the collar fitted to the two actuator arms. Considering now FIGS. 1A and 1B collectively, the portions of the conventional actuator arm assembly shown include a first actuator arm 102 and a second actuator arm 104 and an actuator assembly collar 106. A chemical polishing step may be carried out to polish the surfaces of the actuator arms and to remove any unwanted artifacts of the stamping process. A collar 106 may then be fitted to both actuator arms, which stiffens the resultant actuator arm assembly. However, even though the actuator arms 104, 106 are mechanically coupled to one another by the collar 106, the structure nevertheless still suffers from unwanted resonance modes, which detrimentally affect the performance of the disk drive in which such a conventional actuator arm assembly is utilized. From the foregoing, it may be appreciated that less costly and higher performing arm assemblies are desirable.

SUMMARY OF THE INVENTION

Accordingly, this invention may be regarded as an actuator arm assembly for a disk drive, comprising a first stamped actuator arm and a second stamped actuator arm. The first stamped actuator arm may include a first arm portion, a first body portion and a coil-supporting portion for supporting a coil of a voice coil motor, the first body portion defining a first contact surface. The second stamped actuator arm may include a second arm portion and a second body portion, the second body portion defining a second contact surface. The first and second stamped actuator arms may be configured to be bent and attached to one another such that the first contact surface faces and contacts the second contact surface.

The first actuator arm may be unconnected to the second actuator arm when the arm assembly is stamped from the flat sheet of material. Only the first actuator arm may include a coil-supporting portion. The second body portion may be separate and distinct from the first body portion. The actuator arm assembly further may include a layer of adhesive between the first and second contact surfaces. Alternately, the first and second contact surfaces may be welded together. The first body portion may define a first through bore and the second body portion may define a second through bore and the head stack assembly may further comprise a collar fitted within the first and second through bores. The collar may be fitted within the first and second through bores by a press fitting or swaging process, for example.

The present invention, according to another embodiment thereof, is a head stack assembly for a disk drive. The head stack assembly may include an actuator arm assembly that may include a first stamped actuator arm and a second stamped actuator arm. The first stamped actuator arm may include a first arm portion, a first body portion and a coil-supporting portion for supporting a coil of a voice coil motor, the first body portion defining a first contact surface. The second stamped actuator arm may include a second arm portion and a second body portion, the second body portion defining a second contact surface, the first and second stamped actuator arms may be configured to be bent and attached to one another such that the first contact surface faces and contacts the second contact surface, and a first head gimbal assembly coupled to the actuator arm assembly.

The head stack assembly further may include a second head gimbal assembly coupled to the second actuator arm portion. The first actuator arm may be unconnected to the second actuator arm when the arm assembly is stamped from the flat sheet of material. Only the first actuator arm may include a coil-supporting portion. The second body portion may be separate and distinct from the first body portion. The actuator arm assembly further may include a layer of adhesive between the first and second contact surfaces. Alternately, the first and second contact surfaces may be welded together. The first body portion may define a first through bore and the second body portion may define a second through bore and the head stack assembly may further comprise a collar fitted within the first and second through bores. The collar may be fitted within the first and second through bores by a press fitting or swaging process, for example.

The present invention is also a disk drive, comprising: a disk; a head stack assembly for reading and writing to the disk, the head stack assembly comprising an actuator arm assembly, the actuator assembly that may include a first stamped actuator arm, the first stamped actuator arm may include a first arm portion, a first body portion and a coil-supporting portion for supporting a coil of a voice coil motor, the first body portion defining a first contact surface; a second stamped actuator arm, the second stamped actuator arm may include a second arm portion and a second body portion, the second body portion defining a second contact surface, the first and second stamped actuator arms may be configured to be bent and attached to one another such that the first contact surface faces and contacts the second contact surface, and a first head gimbal assembly coupled to the actuator arm assembly.

The disk drive further may include a second head gimbal assembly coupled to the second actuator arm portion. The first actuator arm may be unconnected to the second actuator arm when the arm assembly is stamped from the flat sheet of material. Only the first actuator arm may include a coil-supporting portion. The second body portion may be separate and distinct from the first body portion. The actuator arm assembly further may include a layer of adhesive between the first and second contact surfaces. Alternately, the first and second contact surfaces may be welded together. The first body portion may define a first through bore and the second body portion may define a second through bore and the head stack assembly may further comprise a collar fitted within the first and second through bores. The collar may be fitted within the first and second through bores by a press fitting or swaging process, for example.

According to another embodiment thereof, the present invention is an actuator arm assembly for a disk drive, comprising: a first stamped actuator arm portion, the first stamped actuator arm portion may include a first arm portion, a first body portion and a coil-supporting portion for supporting a coil of a voice coil motor; a second stamped actuator arm portion, the second stamped actuator arm portion may include a second arm portion and a second body portion, and an arm joining portion extending longitudinally along the first and second stamped actuator arm portions, the arm joining portion integrally joining the first stamped actuator arm portion to the second stamped actuator arm portion, the arm joining portion being configured to be bent such that the first stamped actuator arm portion may be aligned with and faces the second stamped actuator arm portion.

The second stamped actuator arm portion may be devoid of a coil-supporting portion. The actuator arm assembly may be stamped from a single sheet of material. Both first and second stamped actuator arm portions may be further configured to be bent such that when the arm joining portion is bent, the first stamped actuator arm portion faces and is separated from the second stamped actuator arm portion by a predetermined distance. Part of the first stamped actuator arm portion between the first body portion and the coil supporting portion may be configured to be bent such that the coil supporting is substantially centered between the first stamped actuator arm portion and the second stamped actuator arm portion. The first body portion may define a first through bore and the second body portion may define a second through bore. The actuator arm assembly may further comprise a collar fitted within the first and second through bores. The collar may be fit within the first and second through bores by a press fitting or swaging process, for example.

The present invention, according to yet another embodiment thereof, is a head stack assembly for a disk drive, the head stack assembly comprising: an actuator arm assembly, comprising: a first stamped actuator arm portion, the first stamped actuator arm portion may include a first arm portion, a first body portion and a coil-supporting portion for supporting a coil of a voice coil motor; a second stamped actuator arm portion, the second stamped actuator arm portion may include a second arm portion and a second body portion; an arm joining portion extending longitudinally along the first and second stamped actuator arm portions, the arm joining portion integrally joining the first stamped actuator arm portion to the second stamped actuator arm portion, the arm joining portion being configured to be bent such that the first stamped actuator arm portion may be aligned with and faces the second stamped actuator arm portion, and a first head gimbal assembly coupled to the stamped actuator arm assembly.

The second stamped actuator arm portion may be devoid of a coil-supporting portion. The actuator arm assembly may be stamped from a single sheet of material. Both first and second stamped actuator arm portions may be further configured to be bent such that when the arm joining portion is bent, the first stamped actuator arm portion faces and is separated from the second stamped actuator arm portion by a predetermined distance. Part of the first stamped actuator arm portion between the first body portion and the coil supporting portion may be configured to be bent such that the coil supporting is substantially centered between the first stamped actuator arm portion and the second stamped actuator arm portion. The first body portion may define a first through bore and the second body portion may define a second through bore. The actuator arm assembly may further comprise a collar fitted within the first and second through bores. The collar may be fit within the first and second through bores by a press fitting or swaging process, for example.

The present invention, according to another embodiment thereof, may also be viewed as a disk drive, comprising: a disk; a head stack assembly for reading and writing to the disk, the head stack assembly comprising: an actuator arm assembly, may include: a first stamped actuator arm portion, the first stamped actuator arm portion may include a first arm portion, a first body portion and a coil-supporting portion for supporting a coil of a voice coil motor; a second stamped actuator arm portion, the second stamped actuator arm portion may include a second arm portion and a second body portion, and an arm joining portion extending longitudinally along the first and second stamped actuator arm portions, the arm joining portion integrally joining the first stamped actuator arm portion to the second stamped actuator arm portion, the arm joining portion being configured to be bent such that the first stamped actuator arm portion may be aligned with and faces the second stamped actuator arm portion, and a first head gimbal assembly coupled to the actuator arm assembly.

The second stamped actuator arm portion may be devoid of a coil-supporting portion. The actuator arm assembly may be stamped from a single sheet of material. Both first and second stamped actuator arm portions may be further configured to be bent such that when the arm joining portion may be bent, the first stamped actuator arm portion may be faces and may be separated from the second stamped actuator arm portion by a predetermined distance. Part of the first stamped actuator arm portion between the first body portion and the coil supporting portion may be configured to be bent such that the coil supporting may be substantially centered between the first stamped actuator arm portion and the second stamped actuator arm portion. The first body portion may define a first through bore and the second body portion may define a second through bore. The actuator arm assembly may further comprise a collar fitted within the first and second through bores. The collar may be fit within the first and second through bores by a press fitting or swaging process, for example.

The foregoing and other features of the invention are described in detail below and set forth in the appended claims.

DESCRIPTION OF THE PREFERRED EMBODIMENTS

Embodiments of the present invention call for the actuator arms to be made from a stamping process. The actuator arm assemblies disclosed herein, whether formed as a one-piece integrated assembly or formed by separate first and second actuator arms, may be may be made by providing a flat sheet of material, such as a flat sheet of steel. Either the integrated one-piece assemblies or the constituent first and second actuator arms may be stamped from this flat sheet of material. The stamping process according to embodiments of the present invention may also form all or substantially all of the required features of the present actuator arm assemblies such as, for example, through bores to accommodate a collar and/or pivot bearing cartridge and/or any other desired structural features.

Figure 2A:
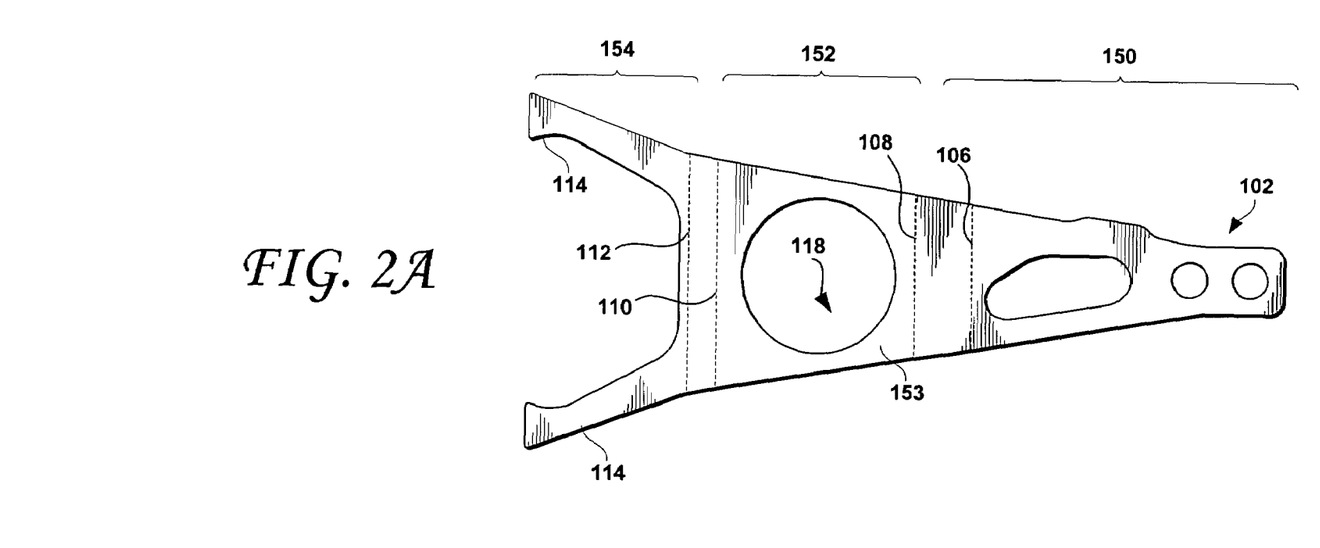
FIG. 2A is a plan view of a first stamped actuator arm, according to an embodiment of the present invention.

FIG. 2A is a plan view of a first actuator arm 102 of an actuator arm assembly according to an embodiment of the present invention. The plan view of FIG. 2A shows the first stamped actuator arm 102 in a configuration after the stamping process, but before it is bent and made to assume its final configuration. As shown, the first actuator arm 102 is a flat stamped part having the thickness of the sheet of material from which it was stamped. The first stamped actuator arm 102 includes a first arm portion 150, a first body portion 152 and a coil-supporting portion 154 for supporting a coil (such as shown at 1024 in FIG. 10) of a voice coil motor. The coil-supporting portion 154 may include a pair of coil-supporting arms 114. As is detailed below, the first actuator arm 102 is configured to be bent into its final configuration at or around the dashed lines referenced at numerals 106, 108, 110 and 112.

Figure 2B:
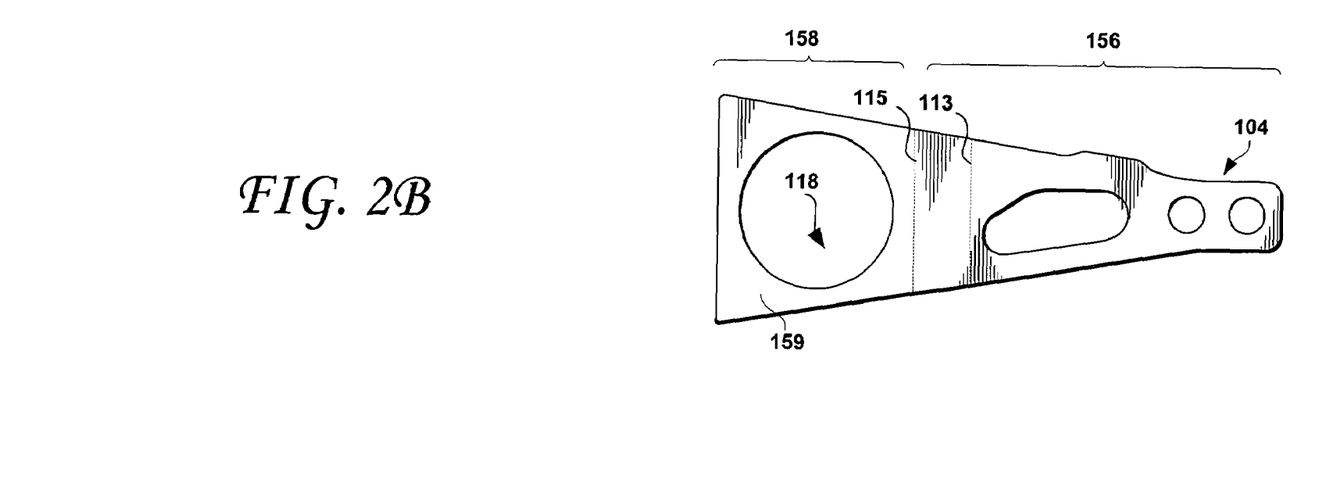
FIG. 2B is a plan view of a second stamped actuator arm that may be combined with the first actuator arm of FIG. 2A to form an actuator arm assembly according to an embodiment of the present invention.

FIG. 2B is a plan view of a second actuator arm 104 that may be combined with the first actuator arm 102 of FIG. 2A to form an actuator arm assembly according to an embodiment of the present invention. The first stamped actuator arm 102 is also a flat stamped part having the thickness of the sheet of material from which it was stamped. The second stamped actuator arm 104 may be stamped separately from the first actuator arm 102 and may be unconnected to the first actuator arm 102 when the arms 102, 104 are stamped from the flat sheet of material. As with the first stamped actuator arm 102, the second stamped actuator arm 104 is configured to be bent into its final configuration at or around the dashed lines referenced at numerals 113 and 115. The second stamped actuator arm 104 may only include a second arm portion 156 and a second body portion 158. As such, only the first stamped actuator arm 102 may include a coil-supporting portion, such as shown at 154 in FIG. 1A.

As shown, the first stamped actuator arm 102, within the first body portion 152, defines a first contact surface 153. Similarly, the second stamped actuator arm 104, within the second body portion 158, defines a second contact portion 159. According to this embodiment of the present invention, the first and second stamped actuator arms 102, 104 are configured to be bent and attached to one another such that the first contact surface 153 faces and contacts the second contact surface 159.

Figure 3:
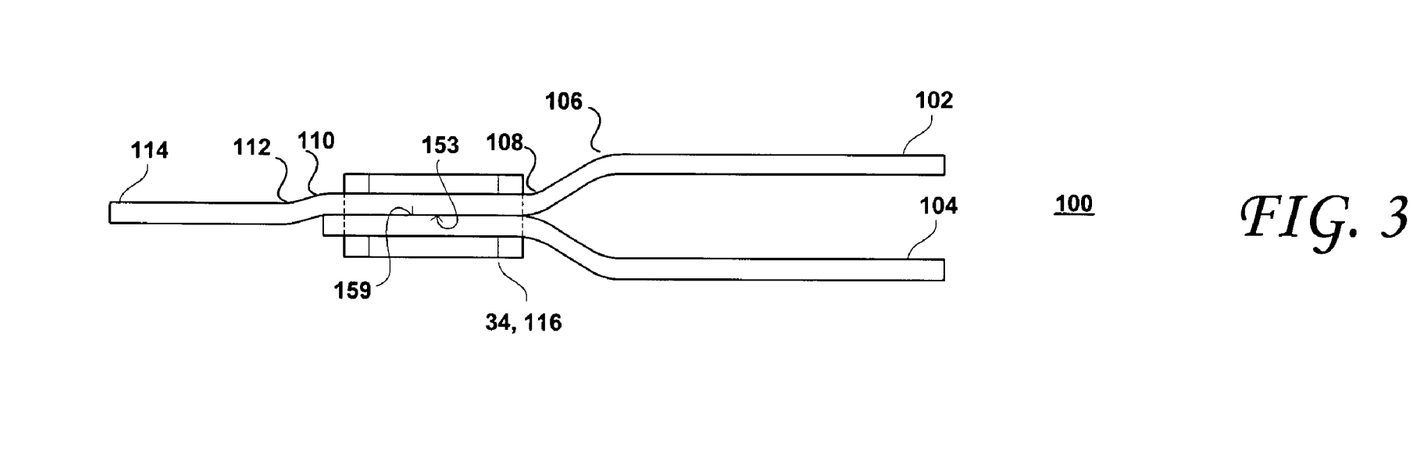
FIG. 3 is a side view of an actuator assembly that includes the first actuator arm of FIG. 1A, the second actuator arm of FIG. 1B, and that is fitted with a collar or pivot bearing cartridge.
Figure 4:
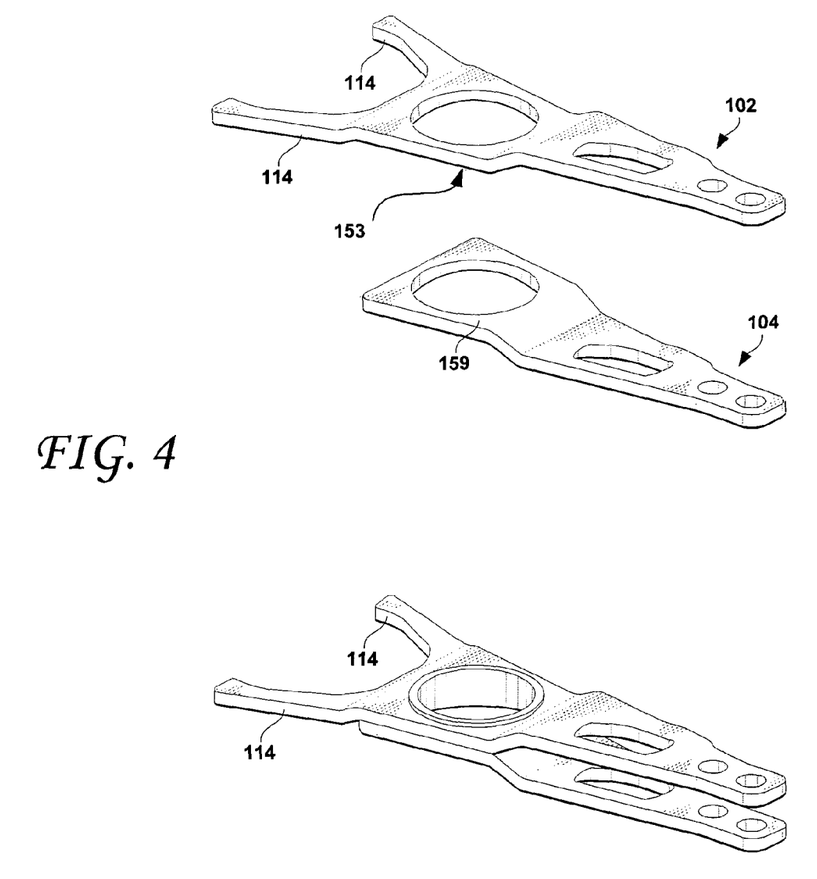
FIG. 4 includes perspective views of the first and second stamped actuator arms of FIGS. 2A and 2B as well as a perspective view an actuator arm assembly formed of the first and second stamped actuator arms shown in FIGS. 2A and 2B.

FIG. 3 is a side view of an actuator assembly 100 that includes the first stamped actuator arm 102 of FIG. 1A, the second stamped actuator arm of FIG. 1B, and that fitted with a collar 116 or pivot bearing cartridge 34. In FIG. 3, the first and second stamped actuator arms 102, 104 are shown in their bent configuration and attached to one another to form an actuator arm assembly 100. As shown, the first actuator arm 102 is shown bent at 106, 108, 110 and 112. The degree of the bends 106 and 108 will depend upon the ultimate desired separation of the heads of the head gimbal assemblies to be mounted on the assembly 100. It should be noted that only a single head gimbal assembly need be mounted to the actuator arm assembly 100 in the case wherein only slider is desired, such as may the case wherein the disk drive only has a single disk having a single recording surface. The first stamped actuator arm 102 may be bent at 110, 112 so as to center the coil supporting portion 154 between the two arm portions 150, 156. The first actuator arm 102 is attached to the second stamped actuator arm 104. This attachment may be effectuated by means of, for example, (e.g., laser) welding, adhesive and/or a swaging process with a collar and/or pivot bearing cartridge fitted within the through bore shown at 118 defined within the first and second body portions 152, 158 of the first and second actuator arms 102, 104. The embodiment of FIG. 3 is shown with a collar 116 fitted within the through bores 118 defined within the first and second body portions 152, 158. FIG. 4 includes individual perspective views of the first and second stamped actuator arms 102, 104 and a perspective view of an actuator arm assembly incorporating the first and second stamped actuator arms 102, 104. As shown, the first and second stamped actuator arms 102, 104 are configured to be bent and attached to one another such that the first contact surface 153 faces and contacts the second contact surface 159

Figure 5:
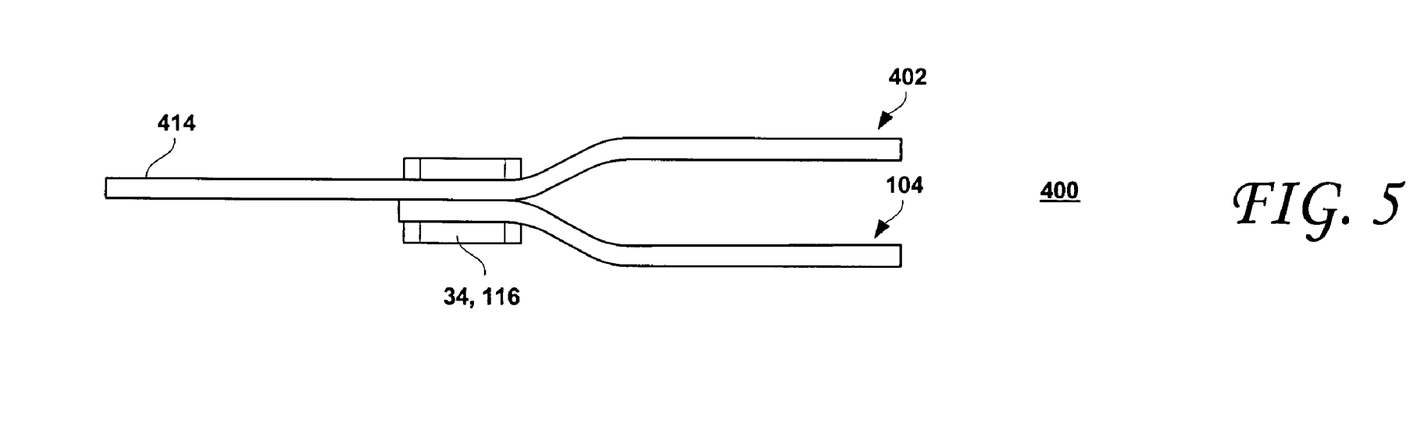
FIG. 5 shows a side view of another embodiment of an actuator arm assembly, according to another embodiment of the present invention.

FIG. 5 is a side view of an actuator arm assembly 400 according to another embodiments of the present invention. As shown, the actuator arm assembly 400 includes a first stamped actuator arm 402 and may include same second stamped actuator arm 104 as shown in FIGS. 2B and 3. In this embodiment, the bends 110, 112 in the coil supporting portion of FIG. 2A are omitted and the coil-supporting portion and the body portion of the first actuator arm are aligned along a same plane. The bends 110, 112 shown in FIGS. 2A and 3 may be omitted the coil supporting arms 414 need not be centered between the first and second stamped actuator arms 402, 104.

Figures 6, 7:
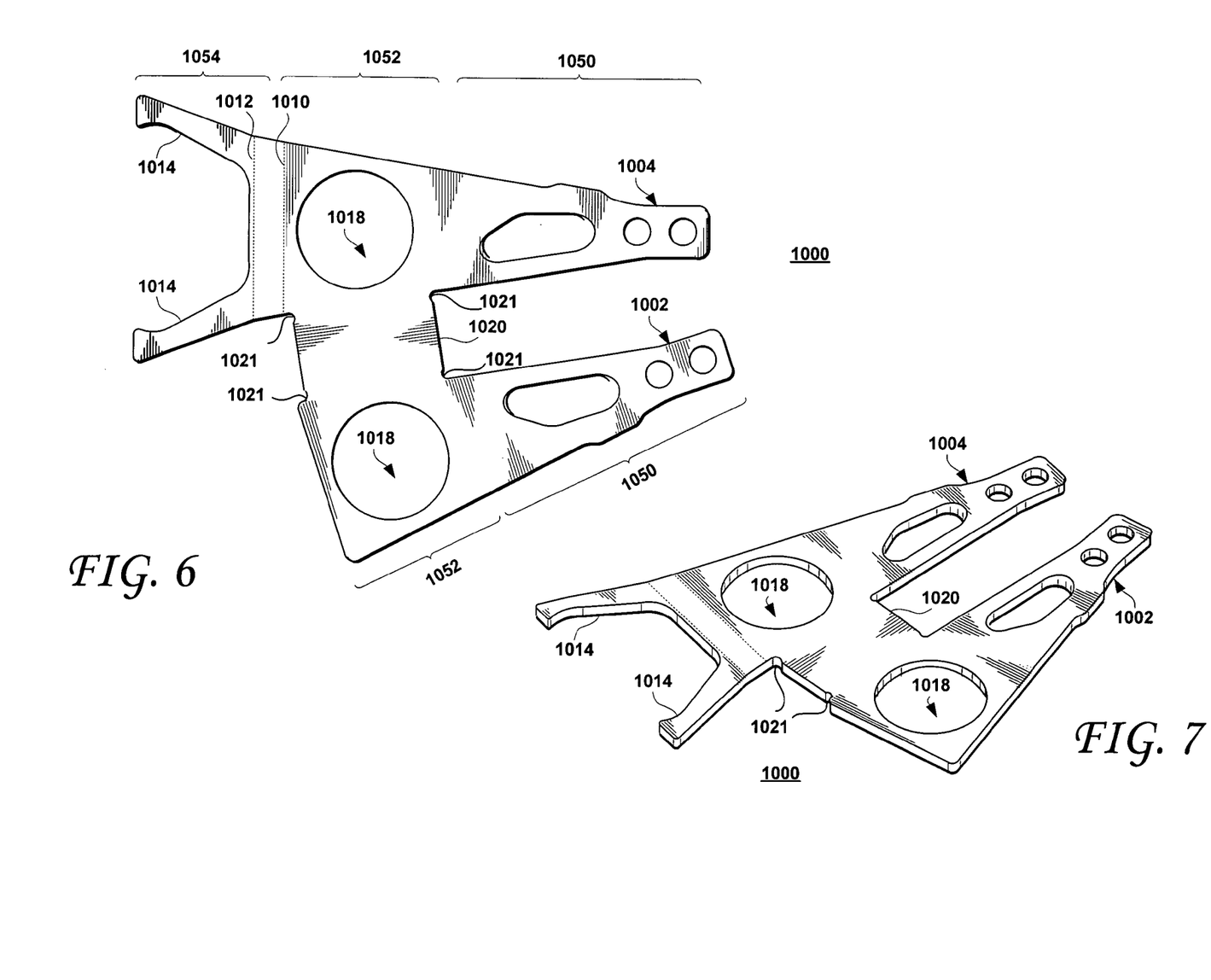
FIG. 6 is a plan view of another embodiment of a one-piece integrated actuator arm assembly in an unbent state, according to a still further embodiment of the present invention.
FIG. 7 is a perspective view of the one-piece integrated actuator arm assembly of FIG. 6.
Figure 8:
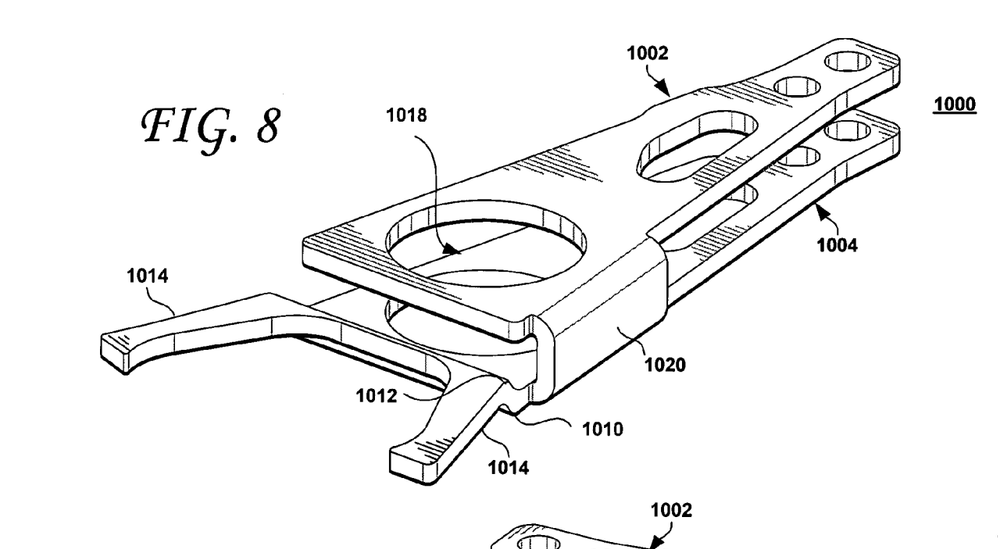
FIG. 8 is a first perspective view of the one-piece integrated actuator arm assembly of FIGS. 6 and 7, in a bent state.
Figure 9:
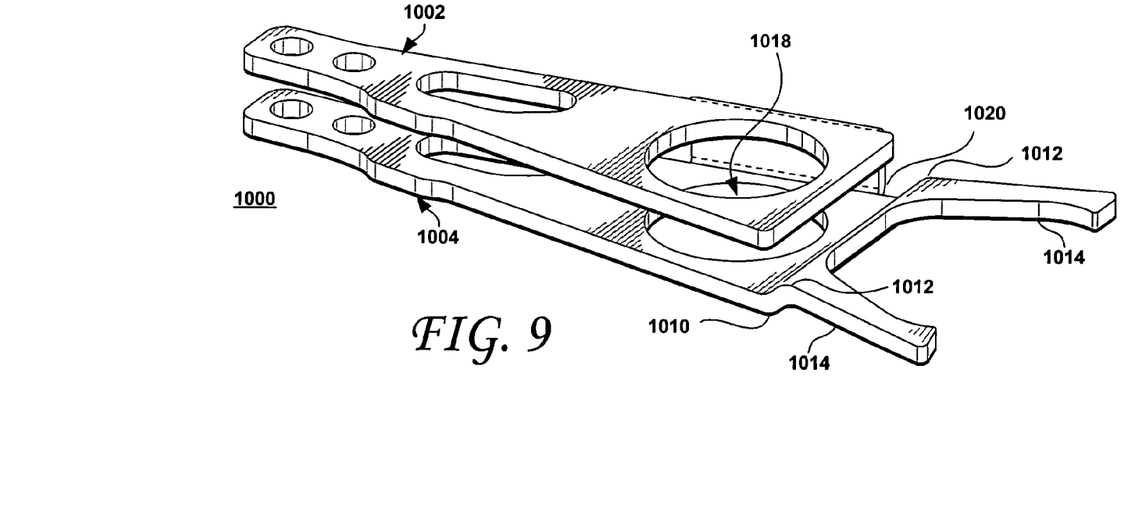
FIG. 9 is a second perspective view of the one-piece integrated actuator arm assembly of FIGS. 6 and 7, in a bent state.

FIG. 6 is a plan view of another embodiment of a one-piece integrated actuator arm assembly 1000 in an unbent state, according to a still further embodiment of the present invention. FIG. 7 is a perspective view of the one-piece integrated actuator arm assembly 1000 of FIG. 6. Considering now FIGS. 6 and 7 collectively, the actuator arm assembly 1000 may be stamped in one piece from a single sheet of material. In the embodiments of FIGS. 6 and 7, the first and second actuator arms 1004, 1002 form integral portions of the actuator arm assembly 100 and are referred to hereunder as first actuator arm portion 1004 and second actuator arm portion 1002. As shown, the first actuator arm portion 1004 and the second actuator arm portion 1004 may each include an arm portion 1050 and a body portion 1052. According to this embodiment, only the first actuator arm portion 1004 includes a coil-supporting portion 1054 that includes a pair of coil-supporting arms 1014. The first actuator arm portion 1004 may (but need not) be bent at or around the dashed lines shown at 1010 and 1012. Joining the first and second actuator arm portions 1004 and 1002 is an actuator arm-joining portion 1020 that integrally joins the first and second actuator arms portions 1004, 1002 such that the first and second actuator arm portions 1004, 1002 are connected and form a one-piece part when the actuator arm assembly 1000 is stamped from the flat sheet of material. The actuator arm-joining portion 1020 may define notches 1021 to facilitate the bending thereof, as detailed below.

Figures 10, 11:
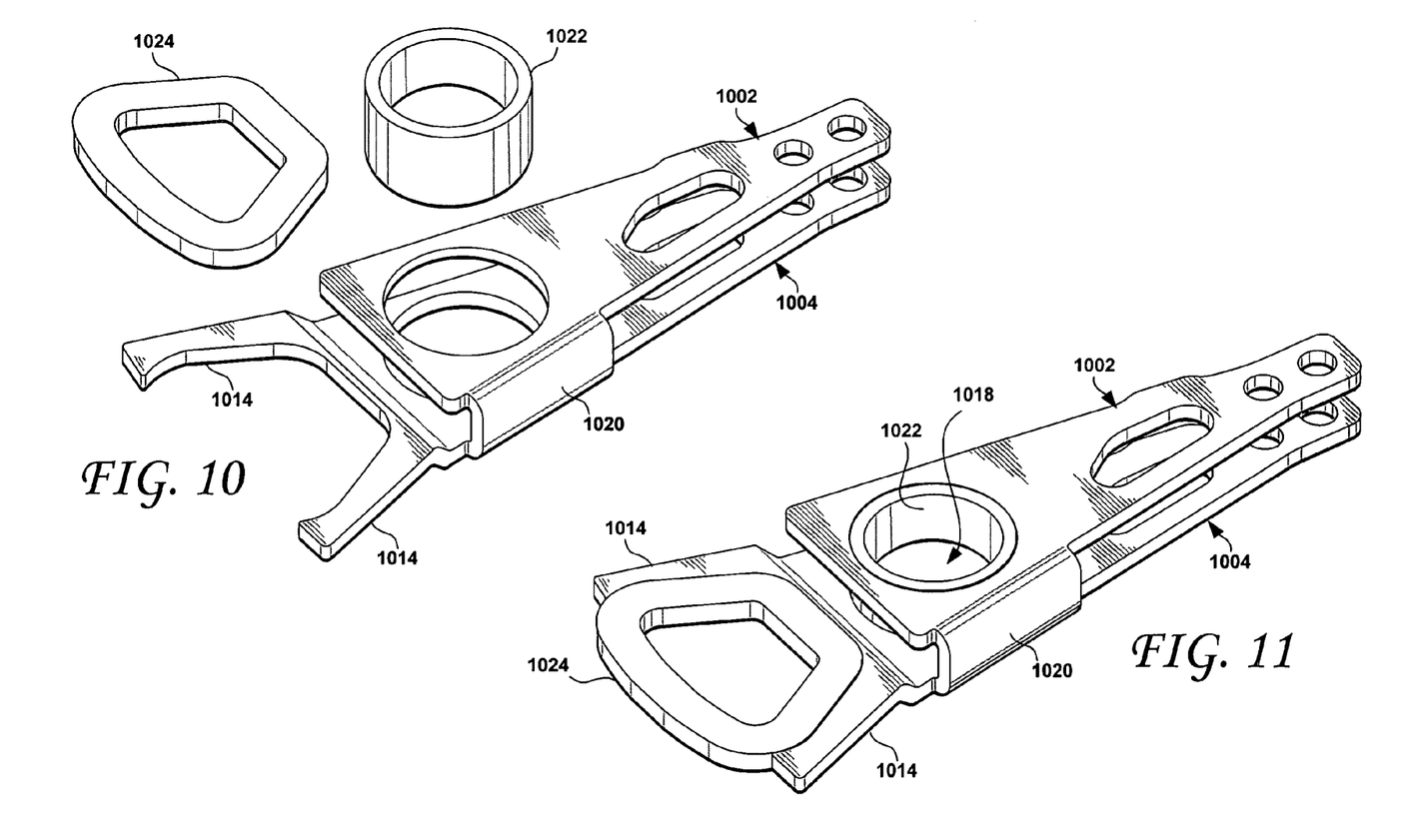
FIG. 10 is a perspective view of the one-piece integrated actuator arm assembly FIGS. 8 and 9, prior to the fitting of the coil of the VCM and the collar.
FIG. 11 is a perspective view of the one-piece integrated actuator arm assembly FIGS. 8 and 9, after the fitting of the coil of the VCM and the collar thereto.

As shown in FIGS. 8–11, the actuator arm assembly 1000 is bent such that the body portion of the first and second arm portions 1004, 1002 are kept separated from one another by a predetermined distance. This may be accomplished by suitably bending the arm joining portion 1020. As shown in FIGS. 10 and 11, a collar 1022 may be fitted within the void 1018 defined within the body portion 1052 of the first and second actuator arm portions 1004, 1002. A coil 1024 of a VCM may be fitted within the coil supporting arms 1014 of the coil supporting portion 1054 of the first actuator arm portion 1004 by means of, for example, a layer of adhesive and/or a plastic overmold.

Whether the actuator arms are separate parts as shown, for example, in FIGS. 2A–5 or are integral constituent portions of a one-piece actuator arm assembly as shown in FIGS. 6–11, unwanted resonance modes are pushed to higher frequencies due to the high stiffness of the resultant actuator arm assembly. In FIGS. 2A–5, the large surface area over which the first and second actuator arms contact each other within the body portion contribute to an increased stiffness of the resultant actuator arm assembly. In FIGS. 6–11, the one piece nature of the actuator arm assembly and the arm joining portions described above beneficially contribute to increasing stiffness of the resultant assembly.

Figure 12:
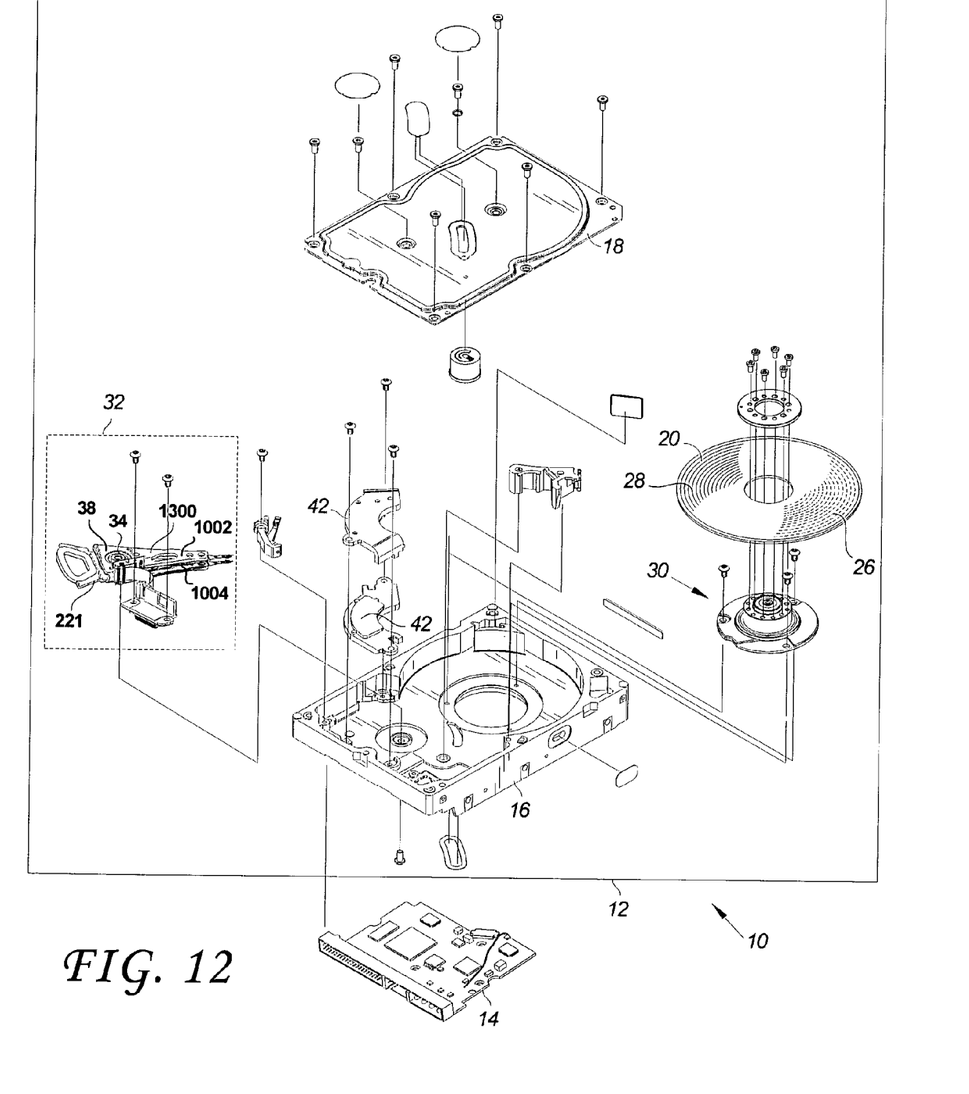
FIG. 12 is an exploded view of a disk drive according to an embodiment of the present invention.

FIG. 12 is an exploded perspective view of a disk drive 10 incorporating aspects of embodiments of the present invention. As shown, the disk drive 10 includes a HDA 12 and a PCBA 14. The HDA 12 includes a disk drive base 16 and a cover 18 that collectively house one or more magnetic disks 20. The magnetic disk 20 contains a plurality of tracks for storing data. The magnetic disk 20 may be two-sided, and thus for example, the magnetic disk 20 is shown having tracks 28 on an upper facing side and tracks 26 (shown in phantom lines) on a lower facing side. The head disk assembly 12 further includes a spindle motor 30 for rotating the magnetic disk 20. The head disk assembly 12 further includes a HSA 32 and a pivot-bearing cartridge 34. The head stack assembly 32 includes an actuator arm assembly 1300 according to one of the embodiments of the present invention.

The actuator arm assembly 1300 includes an actuator body 38 that defines a bore and the pivot-bearing cartridge 34 engaged within the bore for facilitating the actuator arm assembly 1300 to rotate between limited positions. A pair of coil-supporting arms 1014 may be coupled to the first stamped actuator arm portion 1004 of the actuator arm assembly 1300. The pair of coil-supporting arms 1014 interact with a pair of permanent magnets 42 to form a VCM for pivoting the HSA 32. First and second stamped actuator arm portions 204, 206 extend from an opposite side of the actuator body 38. A head gimbal assembly may be attached to the first actuator arm portion 1004 and/or to the second actuator arm portion 1002. Each head gimbal assembly includes a head for reading and writing data to and from a respective recording surface of the disk 20. In the case wherein only one head gimbal assembly is required (i.e., when the disk 20 only has one recording surface), a compensating weight equivalent to the weight of the missing head gimbal assembly may be attached to the actuator arm portion from which the head gimbal assembly is missing, to preserve the balance of the HSA 32.

The embodiments described and shown herein are illustrative and are not intended to limit the scope of the present invention. Those of skill in this art may recognize that modifications of the described embodiments are possible.

What is claimed is:

1. An actuator arm assembly for a disk drive, comprising:
    a first stamped actuator arm, the first stamped actuator arm including a first arm portion, a first body portion and a coil-supporting portion for supporting a coil of a voice coil motor, the first body portion defining a first through bore and a first contact surface;
    a second stamped actuator arm, the second stamped actuator arm including a second arm portion and a second body portion, the second body portion defining a second through bore and a second contact surface, wherein the first and second stamped actuator arms are configured to be bent and attached to one another such that the first contact surface faces and contacts the second contact surface, and
    a collar fitted within the first and second through bores.

2. The actuator arm assembly of claim 1, wherein the first actuator arm is unconnected to the second actuator arm when the arm assembly is stamped from the flat sheet of material.

3. The actuator arm assembly of claim 1, wherein only the first actuator arm includes a coil-supporting portion.

4. The actuator arm assembly of claim 1, wherein the second body portion is separate and distinct from the first body portion.

5. The actuator arm assembly of claim 1, wherein the first and second contact surfaces are welded together.

6. The actuator arm assembly of claim 1, further including a layer of adhesive between the first and second contact surfaces.

7. The actuator arm assembly of claim 1, wherein the collar is fitted within the first and second through bores by a press fitting or swaging process.

8. A head stack assembly for a disk drive, the head stack assembly comprising:
- an actuator arm assembly, the actuator assembly including:
  - a first stamped actuator arm, the first stamped actuator arm including a first arm portion, a first body portion and a coil-supporting portion for supporting a coil of a voice coil motor, the first body portion defining a first through bore and a first contact surface;
  - a second stamped actuator arm, the second stamped actuator arm including a second arm portion and a second body portion, the second body portion defining a second through bore and a second contact surface, wherein the first and second stamped actuator arms are configured to be bent and attached to one another such that the first contact surface faces and contacts the second contact surface;
  - a collar fitted within the first and second through bores, and
- a first head gimbal assembly coupled to the actuator arm assembly.

9. The head stack assembly of claim 8, further including a second head gimbal assembly coupled to the second actuator arm portion.

10. The head stack assembly of claim 8, wherein the first actuator arm is unconnected to the second actuator arm when the arm assembly is stamped from the flat sheet of material.

11. The head stack assembly of claim 8, wherein only the first actuator arm includes a coil-supporting portion.

12. The head stack assembly of claim 8, wherein the second body portion is separate and distinct from the first body portion.

13. The head stack assembly of claim 8, wherein the first and second contact surfaces are welded together.

14. The head stack assembly of claim 8, further including a layer of adhesive between the first and second contact surfaces.

15. The head stack assembly of claim 8, wherein the collar is fitted within the first and second through bores by a press fitting or swaging process.

16. A disk drive, comprising:
- a disk;
- a head stack assembly for reading and writing to the disk, the head stack assembly comprising:
  - an actuator arm assembly, the actuator assembly including:
    - a first stamped actuator arm, the first stamped actuator arm including a first arm portion, a first body portion and a coil-supporting portion for supporting a coil of a voice coil motor, the first body portion defining a first through bore and a first contact surface;
    - a second stamped actuator arm, the second stamped actuator arm including a second arm portion and a second body portion, the second body portion defining a second through bore and a second contact surface, wherein the first and second stamped actuator arms are configured to be bent and attached to one another such that the first contact surface faces and contacts the second contact surface;
    - a collar fitted within the first and second through bores, and
  - a first head gimbal assembly coupled to the actuator arm assembly.

17. The disk drive of claim 16, further including a second head gimbal assembly coupled to the second actuator arm portion.

18. The disk drive of claim 16, wherein the first actuator arm is unconnected to the second actuator arm when the arm assembly is stamped from the flat sheet of material.

19. The disk drive of claim 16, wherein only the first actuator arm includes a coil-supporting portion.

20. The disk drive of claim 16, wherein the second body portion is separate and distinct from the first body portion.

21. The disk drive of claim 16, wherein the first and second contact surfaces are welded together.

22. The disk drive of claim 16, further including a layer of adhesive between the first and second contact surfaces.

23. The disk drive of claim 16, wherein the collar is fitted within the first and second through bores by a press fitting or swaging process.

* * * * *